United States Patent Office 3,479,223
Patented Nov. 18, 1969

3,479,223
ALKALINE CELL WITH BARRIER-TYPE ORGANIC POLYSULFIDE RESIN SEPARATOR
Joseph C. Duddy, Trevose, Pa., John T. Arms, Pasadena, Calif., and John J. Kelley, Levittown, N.J., assignors, by mesne assignments, to ESB Incorporated, Philadelphia, Pa., a corporation of Delaware
No Drawing. Filed Jan. 6, 1967, Ser. No. 607,661
Int. Cl. H01m 43/00
U.S. Cl. 136—6                          8 Claims

ABSTRACT OF THE DISCLOSURE

A barrier-type separator containing an organic polysulfide resin which is useful in alkaline cells, particularly cells employing a silver oxide active material. The polysulfide resin reacts with active material metallic ions or particles present in the electrolyte to prevent them from short-circuiting the cell. The separator may also contain a cation exchange resin to improve its permeability. The organic polysulfide resin composition may be formed into a self-supporting thin film or it may be used to coat a supporting member.

BACKGROUND OF THE INVENTION

It is well known in the alkaline battery industry that certain electrode active materials, such as silver oxide, are slightly soluble in alkaline electrolyte, and therefore, active material metallic ions and/or colloidal particles may be present in the alkaline electrolyte and may deposit on the electrode of opposite polarity with a resultant short circuit and self-discharge of the cell. The standard method for controlling this problem is to interpose a separator between the electrodes, with the separator material being permeable to the electrolyte ions but of controlled or limited permeability to the metallic ions and colloidal particles. Cellulosic materials such as cellophane are commonly employed as separator materials, but the metallic ions or particles from the electrode active material present in the electrolyte tend to penetrate the cellulosic material and accelerate its oxidation and consequent deterioration. One of the products of the oxidation-reduction reaction between the cellulosic material and the active material metallic ions is the elemental metal which is highly conductive and tends to form short circuit paths through the separator material. Many attempts have been made to improve the oxidation resistance of cellulosic separator materials, but none of these has proven to be entirely satisfactory.

SUMMARY OF THE INVENTION

The general object of this invention is to provide an improved separator for an alkaline cell which resists penetration of the separator by active material metallic ions or colloidal particles present in the alkaline electrolyte. Other objects and advantages of the invention may be determined from the following description of the invention.

It has been discovered that a separator made from an organic polysulfide resin material is particularly effective in preventing short-circuiting or separator penetration by electrode active material metallic ions and/or colloidal particles which may be present in the alkaline electrolyte of rechargeable alkaline cells. The organic polysulfide resins which are useful in this invention are only those which resist hydrolysis in alkaline solution. In accordance with this invention, the organic polysulfide separator material reacts with the active material metallic ions dissolved in the electrolyte to form a metal sulfide which is substantially insoluble in the alkaline electrolyte. Another feature of the polysulfide resin separator material is that if the separator-metallic ion or particle reaction product is a poor electrical conductor, such as silver sulfide, the effectiveness of the separator as an electronic barrier may be increased. In addition, whereas many conventional cellulosic separators lose their physical strength as a result of reacting with the active material metallic ions or particles, the separator function of the polysulfide resin material is not impaired.

The problem of migrating metallic ions and/or colloidal particles is especially troublesome in alkaline systems employing silver oxide active material, and it is in such systems that the organic polysulfide resin separator material is particularly effective, though it may be used in any alkaline system. Since separator failure is generally the limiting factor in alkaline systems, the novel organic polysulfide resin separators provide better cycle life (i.e. more cycles) and greater total capacity. The polysulfide resin separators may also be particularly useful in alkaline systems, both rechargeable and primary which are subjected to elevated temperatures, for the higher temperature may increase the dissolution rate of the electrode active materials and thereby produce a higher concentration of active material metallic ions or colloidal particles in the alkaline electrolyte. While not limited thereto, the following description and examples will refer primarily to a silver-cadmium alkaline system in order to illustrate the advantages of this invention.

DETAILED DESCRIPTION

In preparing an organic polysulfide resin membrane to be used as a separator in accordance with this invention, a polysulfide prepolymer is selected which will give the desired properties. The polysulfide prepolymer is generally in the form of a viscous liquid. It is preferred that the polysulfide prepolymer contain no fillers or additional ingredients, but this is not essential. In fact, a caulking compound for boats comprising a polysulfide prepolymer and a calcium carbonate filler has been used to successfully prepare a polysulfide resin separator membrane.

In order to improve the permeability of the polysulfide resin separator and thus reduce its ohmic resistance, a cation exchange resin may be incorporated into the organic polysulfide resin. In general, the cation exchange resin comprises from about 15 to about 60% of the separator material based on the weight of the cation exchange resin and the organic polysulfide resin. The cation exchange resin may be either a strong acid type, such as one containing sulfonic acid groups, or a weak acid type, such as powdered polymethacrylic acid, but in either case, the cation exchange resin must be resistant to attack by the alkaline electrolyte, i.e., it must resist hydrolysis. It is preferred to reduce the size of the cation exchange resin to a fine powder by passing it through a micropulverizer before incorporating it into the polysulfide prepolymer.

The polysulfide/cation exchange resin material also contains a catalyst to cure the polysulfide prepolymer. Examples of catalysts which may be used are lead dioxide ($PbO_2$) and zinc oxide ($ZnO$). The $PbO_2$ is preferred because it cures the polysulfide prepolymer at room temperature, whereas the prepolymer mixture must be heated when using the ZnO catalyst. $PbO_2$ catalyst for curing polysulfide prepolymers is commercially available dispersed in a suitable dispersing medium. The polysulfide prepolymer, catalyst and the cation exchange resin are thoroughly and homogeneously blended by intensive mixing such as in a paint mill.

After the mass has been thoroughly mixed, it is shaped into a thin film in any convenient manner. Typical of the methods which may be used are sheeting, calendering, extruding or rolling. The film is cured by reacting with atmospheric moisture at room or slightly elevated temperatures. A brown coloration is developed in the film by the $PbO_2$ catalyst particles, but this color is almost completely lost when the membrane is equilibrated by placing it in alkaline solution (e.g., potassium hydroxide solution) which dissolves the catalyst.

It has been found that polysulfide/cation exchange resin films having maximum swelling and lowest electrical resistance are obtained by high temperature equilibration in dilute alkaline solution. However, equilibration temperatures greater than 70° C. may cause excessive swelling manifested as bubbles on the surface of the film. An equilibration bath of a 5% KOH solution maintained at about 50° C. has been found to be satisfactory, though more concentrated KOH solutions can be used at room temperatures. After the equilibration treatment, the film is dried and is then ready for use as an alkaline battery separator.

The dissolution of the catalyst imparts a slight permeability to the membrane, but the major contribution to permeability comes from the swelling of the cation exchange resin when it is contacted by the alkaline electrolyte during equilibration. The cation exchange resin particles are bound in the flexible polysulfide resin matrix which permits the cation exchange resin to expand and also imparts flexibility to the membrane. In the manufacture of alkaline cells employing the polysulfide resin separators of this invention, the separator material may be equilibrated in a suitable bath (5% KOH solution), passed into an electrolyte bath having the desired concentration of alkali (e.g., 40% KOH solution), and then the separator material may be cut to the proper size and placed in the cell in a wet condition.

An alternate method for preparing organic polysulfide resin separators in accordance with this invention comprises coating the polysulfide resin onto one or both sides of a supporting member. Examples of suitable supporting members are nylon mesh and cellophane film such as that which is conventionally used as a separator material in alkaline cells. The uncured polysulfide resin composition may be coated onto the substrate and thereafter cured to firmly attach it to the substrate. As in the unsupported films, it may be necessary to incorporate a cation exchange resin into the polysulfide resin composition to provide the necessary permeability. The polysulfide resin composition may be calendered or otherwise spread on and pressed into the substrate, and thereafter, it may be cured. An alternative procedure for coating a substrate comprises forming a solution of the polysulfide resin in a solvent which may be applied to a supporting film member by impregnating spraying or dip coating the film.

The following examples illustrate the preparation of organic polysulfide/cation exchange resin separator material and the advantages achieved when it is used as the separator in a rechargeable silver-cadmium alkaline cell.

Example I

An organic polysulfide resin membrane was prepared from a polysulfide prepolymer which is commercially available under the grade designation Thiokol T78G. This prepolymer was mixed with about 25% by weight of powdered polymethacrylic acid (a cation exchange resin commercially available as Rohm & Haas XE-97) which had been further reduced in size by passing it through a micropulverizer. In addition, 10% by weight of finely divided lead dioxide ($PbO_2$) catalyst in a dispersing medium was incorporated into the mixture, and these ingredients were thoroughly mixed in a paint mill.

The polysulfide-polymethacrylic acid mixture was sheeted into a thin film, without a support, and was allowed to cure at room temperature. The film developed a brown color which was due to the catalyst particles. The membrane was immersed in water for 1 hour and then in 31% potassium hydroxide solution at room temperature for 3 hours to equilibrate it, and the lead dioxide catalyst particles were dissolved.

Thiokol T78G is a thixotropic sealant based on an LP-32 polysulfide polymer. Thiokol T78G has the following formulation.

Part A: Parts by wt.
  LP-32 polysulfide polymer _____ 100
  Sodium carbonate _____ 25
  Titanium dioxide _____ 10
  Stearic acid _____ 1
  Sulfur _____ 0.1
  Polyvinyl acetate (soaked in phenolic resin) adhesive _____ 5
  Chlorinated polyaromatic additive _____ 5
Part B: Accelerator _____ 15

In order to obtain a cure of the base compound, Part A, it is necessary to thoroughly mix the accelerator, Part B, into the compound. The Thiokol T78G sealant compound has good stress-strain properties and good adhesion to most surfaces.

The LP-32 is a low molecular weight liquid polysulfide polymer which is described in U.S. Patent No. 2,466,963. LP-32 polysulfide polymer consists of repeating bis (ethylene oxy) methane groups containing disulfide linkages. The polymer segments are terminated with reactive thiol groups and side thiol groups occur occasionally in the chain. The average structure of LP-32 liquid polymer may be represented as follows:

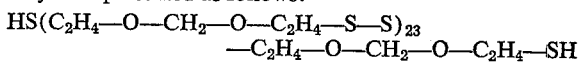

LP-32 polysulfide polymer has a low proportion of branched chains in its structure.

Example II

The polysulfide resin membrane prepared in Example I was tested for its utility as a separator in alkaline battery systems and was compared to other known separator materials. Rechargeable silver-cadmium alkaline "button" cells were used to carry out the tests.

A 12 hour cycle was followed. The cells were charged for 10 hours at voltages ranging between 1.55 and 1.60 volts using a constant potential charger modified to permit a maximum current of 0.07 amp. The cells were discharged at 0.15 amp for 2 hours which represents approximately 70% of the cell capacity at the chosen rate of discharge. Each cell was cycled until it failed to deliver the required 0.3 amp-hr. (0.15 amp x 2 hr.) during discharge, at which time it was removed from the test, and cycling of the other cells was continued. The following results were recorded:

| Separator | Dry Thickness, in. | Wet Thickness, in. | No. of Cycles | Total Ampere, hrs. |
|---|---|---|---|---|
| Polyethylene (Permion 300) | .006 | .006 | 39 | 11.7 |
|  |  |  | 39 | 11.7 |
|  |  |  | 40 | 12.0 |
| Cellophane (PUD 0300) | .0036 | .012 | 88 | 26.4 |
|  |  |  | 88 | 26.4 |
|  |  |  | 88 | 26.4 |
| Silver treated cellophane (PUD 0300) | .0036 | .012 | 76 | 22.8 |
|  |  |  | 76 | 22.8 |
|  |  |  | 67 | 20.1 |
| Fibrous sausage casing | .0055 | .014 | 48 | 14.4 |
|  |  |  | 66 | 19.8 |
| Silver treated fibrous sausage casing | .0055 | .014 | 96 | 28.8 |
|  |  |  | 60 | 18.0 |
| Organic polysulfide | .007 | .009 | 106 | 31.8 |
|  |  |  | 106 | 31.8 |

These results clearly demonstrate the superiority of the organic polysulfide resin separator material in a rechargeable alkaline system employing a silver electrode.

Example III

An organic polysulfide resin membrane was prepared using the following formulation.

| Ingredient: | Amount (gm.) |
|---|---|
| Thiokol FA polysulfide prepolymer | 100 |
| Sulfonic acid type cation exchange resin (IRP 69M) | 100 |
| Powdered ZnO catalyst | 10 |
| Benzothiazyl disulfide | 0.3 |
| Diphenyl guanidine | 0.1 |
| Stearic acid (processing aid) | 0.25 |

These ingredients were mixed on rolls which were maintained at about 170° F. After thorough mixing, the polysulfide cation exchange resin mixture was sheeted to form a membrane having a thickness of 7 mils. The membrane was cured at 300° F. for 40 minutes, and then it was equilibrated for 1 hour in water and 3 hours in 40% KOH solution at room temperature.

Thiokol FA polysulfide prepolymer is prepared by the condensation of dichlorodiethyl formal and ethylene dichloride with sodium polysulfide. The final product has a sulfur rank of 1.80, which means that it contains both monosulfide and disulfide links connecting the organic segments. (Rank is defined as the average number of sulfur atoms per repeating segment in the polymer.) No monofunctional halides are used and the polymer is not treated with reducing agents to split a disulfide link into two thiol groups. The type of chain terminal group has not been definitely determined, and because of the high molecular weight of the polymer, analytical methods are useless. The terminal group could be thiol, hydroxyl, chlorine or vinyl, though there is evidence (reactivity with isocyanates) indicating the presence of hydroxyl terminals in the type FA polymer.

Example IV

The organic polysulfide resin membrane prepared in Example III was used as a separator (single layer) in 3 rechargeable silver-cadmium "button" cells which were tested for stand life. These cells were stored at about 115° F., and cell voltages were checked weekly to determine the presence of short circuits. The normal cell voltage is about 1.40 when measured with a high impedance voltmeter. Generally, it has been found that the cell is probably shorted when the voltage falls below 1.25 volts. However, to be sure that a short has occurred, the voltage should fall below 1.14 volts which is the open circuit voltage of the cell at the low voltage plateau of silver. The results were as follows.

| Cell No.: | No. of weeks without short to date |
|---|---|
| 1 | 10 |
| 2 | 35 |
| 3 | 42 |

Cell No. 1 failed after only 10 weeks, but an inspection of the cell revealed that the failure was not due to a short circuit through the separator material. Unfortunately, the separator was not positioned correctly, i.e. off-center, and a short circuit had developed around the edge of the separator. Cell No. 2 maintained a voltage above 1.14 volts for 35 weeks, and cell No. 3 has been on test for 42 weeks and its voltage is still above 1.14 volts.

Having completely described this invention, what is claimed is:

1. An alkaline cell having a positive electrode, a negative electrode, a separator between said positive and negative electrodes and an alkaline electrolyte, the improvement therein which comprises employing a barrier-type organic polysulfide resin separator which contains an ion exchange resin, said polysulfide resin being resistant to hydrolysis in alkaline electrolyte solution.

2. An alkaline cell in accordance with claim 1 in which the ion exchange resin is a cation exchange resin.

3. An alkaline cell in accordance with claim 2 in which the cation exchange resin is polymethacrylic acid.

4. An alkaline cell in accordance with claim 2 in which the cation exchange resin contains sulfonic acid groups.

5. An alkaline cell in accordance with claim 1 in which the polysulfide resin separator contains from about 15% to about 60% of a cation exchange resin based on the weight of said polysulfide resin and said cation exchange resin.

6. An alkaline cell in accordance with claim 5 in which the positive electrode contains silver oxide active material.

7. An alkaline cell in accordance with claim 6 in which the cation exchange resin is polymethacrylic acid.

8. An alkaline cell in accordance with claim 6 in which the cation exchange resin contains sulfonic acid groups.

References Cited

UNITED STATES PATENTS

| 2,816,154 | 12/1957 | Mendelsohn | 136—146 XR |
| 2,915,579 | 12/1959 | Mendelsohn | 136—146 |
| 3,073,884 | 1/1963 | Pinkerton | 136—137 XR |
| 3,121,028 | 2/1964 | Story | 136—153 XR |

WINSTON A. DOUGLAS, Primary Examiner

D. L. WALTON, Assistant Examiner

U.S. Cl. X.R.

136—146, 153